United States Patent
Kott et al.

(10) Patent No.: US 11,529,983 B2
(45) Date of Patent: Dec. 20, 2022

(54) ARRANGEMENT HAVING A SAFETY-RELATED SYSTEM AND METHOD FOR THE PROTECTED OPERATION THEREOF BY MEANS OF A REMOTE QUERY

(71) Applicant: SIEMENS MOBILITY GMBH, Munich (DE)

(72) Inventors: Juergen Kott, Salzgitter (DE); Frank Renpenning, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 781 days.

(21) Appl. No.: 16/326,421

(22) PCT Filed: Jul. 17, 2017

(86) PCT No.: PCT/EP2017/067967
§ 371 (c)(1),
(2) Date: Feb. 19, 2019

(87) PCT Pub. No.: WO2018/033318
PCT Pub. Date: Feb. 22, 2018

(65) Prior Publication Data
US 2021/0284211 A1    Sep. 16, 2021

(30) Foreign Application Priority Data

Aug. 16, 2016 (DE) .......................... 102016215243.2

(51) Int. Cl.
*G05B 11/01*    (2006.01)
*B61L 27/53*    (2022.01)
(Continued)

(52) U.S. Cl.
CPC ............... *B61L 27/53* (2022.01); *G05B 9/02* (2013.01); *G06F 8/65* (2013.01); *G06F 16/245* (2019.01)

(58) Field of Classification Search
CPC .................................................. B61L 27/0088
(Continued)

(56) References Cited

U.S. PATENT DOCUMENTS 8,705,527 B1 * 4/2014 Addepalli ............. H04W 12/03
370/389
9,419,951 B1 * 8/2016 Felsher ................. H04L 9/0841
(Continued)

FOREIGN PATENT DOCUMENTS

DE       19508731 A1    8/1996
DE   102013217324 A1    3/2015
(Continued)

*Primary Examiner* — Evral E Bodden
(74) *Attorney, Agent, or Firm* — Laurence A. Greenberg; Werner H. Stemer; Ralph E. Locher

(57) ABSTRACT

An arrangement has a technical system, in particular a safety-related system, and a control device which controls the system and can change the technical state of the system by use of control commands. An interface device to be connected to the control device is provided. The interface device forms an external interface for connection to an external remote query device. The interface device has a checking device which is configured in such a manner that it checks a received remote query signal for the presence of a query command stored as permissible in the interface device. In the event of permissibility, the interface device forwards only the query command to the control device and blocks the forwarding of the remote query signal as such or all other control commands which are not query commands stored as permissible.

16 Claims, 8 Drawing Sheets

(51) Int. Cl.
  *G06F 16/245* (2019.01)
  *G05B 9/02* (2006.01)
  *G06F 8/65* (2018.01)
(58) Field of Classification Search
  USPC .......................................................... 700/12
  See application file for complete search history.

(56) References Cited

U.S. PATENT DOCUMENTS

| | | | |
|---|---|---|---|
| 10,102,500 B2 * | 10/2018 | Fung | G06Q 10/0875 |
| 10,122,754 B2 | 11/2018 | Falk et al. | |
| 2005/0091515 A1 * | 4/2005 | Roddy | H04L 63/08 |
| | | | 713/188 |
| 2007/0061455 A1 | 3/2007 | Callaghan | |
| 2014/0172205 A1 | 6/2014 | Ruhland et al. | |
| 2015/0188985 A1 * | 7/2015 | Marty | H04L 63/0227 |
| | | | 709/218 |
| 2015/0293806 A1 | 10/2015 | Cornes et al. | |
| 2017/0353368 A1 | 12/2017 | Bloecher et al. | |

FOREIGN PATENT DOCUMENTS

| | | | | |
|---|---|---|---|---|
| DE | 102013226171 A1 | 7/2015 | | |
| DE | 102014226398 A1 | 6/2016 | | |
| DE | 102016205983 A1 | 10/2017 | | |
| EP | 0909692 A2 * | 4/1999 | .......... | B61L 27/0005 |
| EP | 0909692 A2 | 4/1999 | | |
| EP | 0997807 A2 * | 5/2000 | ............. | B61L 19/00 |
| EP | 0997807 A2 | 5/2000 | | |
| EP | 2926505 B1 * | 8/2019 | ............ | H04J 3/0697 |

\* cited by examiner

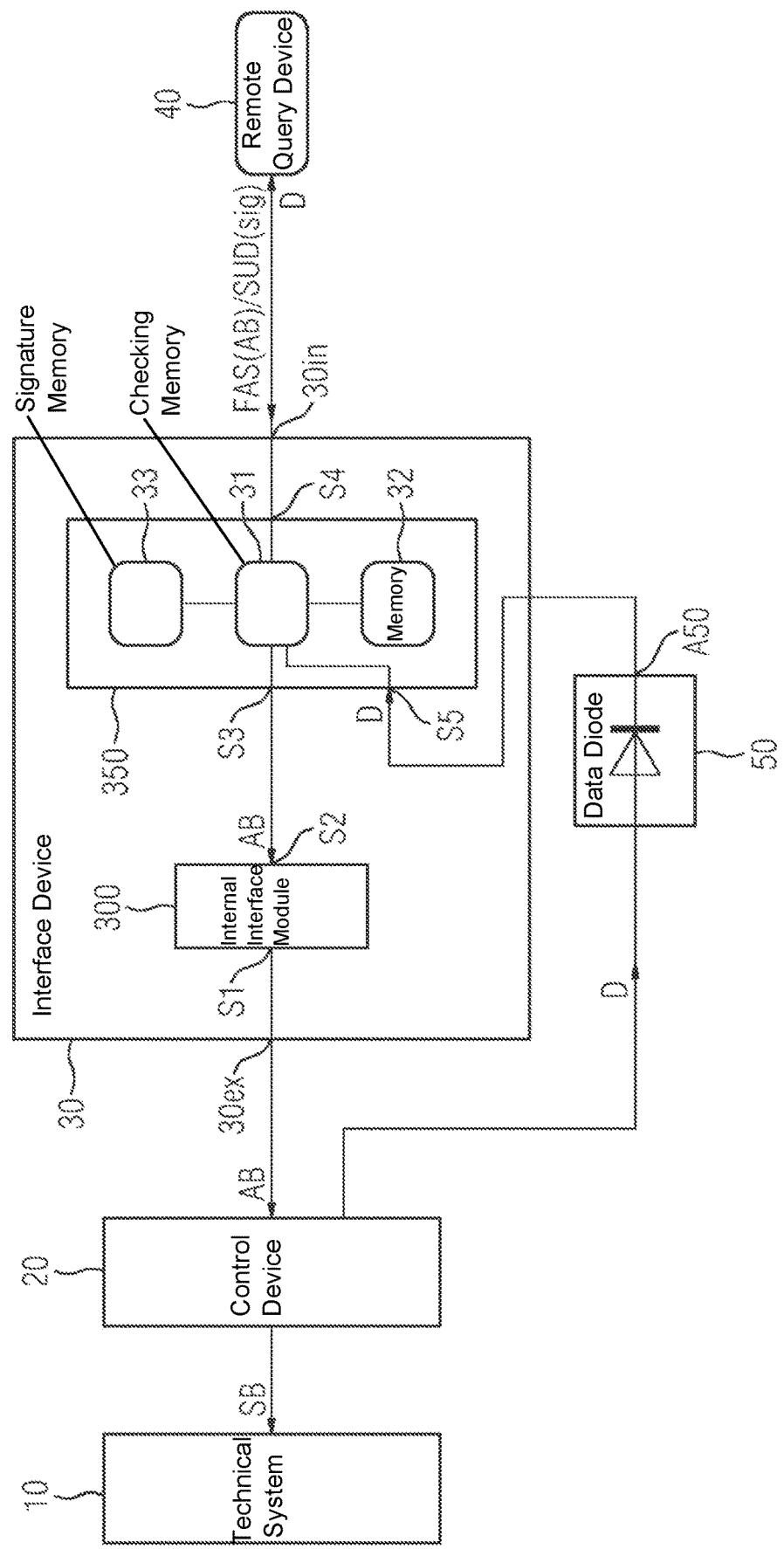

ARRANGEMENT HAVING A SAFETY-RELATED SYSTEM AND METHOD FOR THE PROTECTED OPERATION THEREOF BY MEANS OF A REMOTE QUERY

BACKGROUND OF THE INVENTION

The invention relates to an arrangement having a technical system, in particular a safety-related system, and a control device which controls the system and can change the technical state of the system by means of control commands.

SUMMARY OF THE INVENTION

The object of the invention is to specify an arrangement which enables the querying of data from the control device by means of an external remote query device, but permissibly prevents a manipulation of the control device from outside.

This object is achieved according to the invention by an arrangement with the features as claimed in the independent claim. Advantageous embodiments of the arrangement according to the invention are specified in subclaims.

Thereafter, the invention provides for an interface device to be connected to the control device, which interface device forms an external interface for connection to an external remote query device, wherein the interface device has a checking device which is configured in such a manner that it checks a received remote query signal for the presence of a query command stored as permissible in the interface device and in the event of permissibility, passes only the query command through to the control device and blocks passing through of the remote query signal as such or all other control commands which are not query commands stored as permissible.

A significant advantage of the arrangement according to the invention can be seen in the fact that the interface device enables a remote query of system data from the control device and thus from the technical system as a whole, without jeopardizing the safety of the operation of the technical system; because the interface device prevents an immediate feeding of control signals or control commands into the control device and/or the technical system. According to the invention, after receipt of a remote query signal, a check is first made for the presence of a query command stored as permissible and—only if such a query command has been detected by the interface device—only the respective query command is indirectly passed through to the control device. A remote query signal as such therefore does not reach the control device.

In the field of railway technology, in particular high safety requirements must be met; accordingly, it is considered advantageous if the safety-related system is a railway system and the control commands which would change the technical state of the system are those that would change the operating status of the railway system.

With a view to providing a particularly good decoupling between the control device and the external remote query device, it is considered advantageous if the interface device is two- or multi-stage and has two or more interface modules which are cascaded via interfaces connected in series, wherein a signal is transmitted between at least two of the interface modules using another transmission standard or on the basis of another packet protocol as the communication between the interface device and the remote query device.

It is advantageous if the first interface module in the cascade which is in contact with the external remote query device is designed in such a way that if a remote query signal is present containing a query command recognized as permissible, the first interface module only passes the query command through to the interface module next in the cascade, namely with a packet protocol change or on the basis of packet-free signal transmission (that is to say, with the complete omission of a packet protocol).

In an embodiment of the arrangement considered particularly advantageous it is provided that the interface device has an internal interface module and an external interface module, each of which have an internal interface and an external interface, the internal interface module is connected by means of its internal interface—hereinafter referred to as first interface—to the control device and by means of its external interface—hereinafter referred to as second interface—to an upstream interface module of the module cascade, in the event of two interface modules to the external interface module, the external interface module by means of its internal interface—hereinafter referred to as third interface—to the interface of a downstream interface module, in the event of two interface modules to the internal interface module, and can be connected by means of its external interface—hereinafter referred to as fourth interface—to the remote query device, and the checking device is included in the external interface module.

The checking device is preferably included in the external interface module.

With a view to effective decoupling between the control device and the external query device, it is considered advantageous if the fourth interface is a packet-oriented interface which performs a protocol-based communication with the remote query device on the basis of a predetermined external packet protocol, and the data transmission between at least two of the interface modules, in the case of two interface modules between the second and third interface, is on the basis of an internal packet-free signal transmission or is on the basis of an internal packet protocol which differs from the external packet protocol.

The internal interface module is preferably designed such that—if a query command is present on its second interface—it passes the query command through to the first interface and thus to the control device, namely on the basis of a third packet protocol, which differs from the internal packet protocol and/or the external packet protocol, or on the basis of a packet-free signal transmission which differs from the internal packet-free signal transmission.

If a query command is present, the control device can transmit the requested data via the interface device to the external remote query device.

In a particularly preferred variant, it is provided that in parallel to at least the last interface module in the cascade—seen from the remote query device, that is to say, the interface module which is connected to the control device, —in particular, to the internal interface module in the case of two interface modules—or a data diode is connected in parallel to the interface device as a whole and if there is a query command, the control device transmits the requested data via the data diode and thus to the interface module connected to the control device, —in particular, the internal interface module in the case of two interface modules—or past the interface device as a whole to the external remote query device. By passing the data past the interface device as a whole or past at least one of the interface modules, a high data transmission rate can be advantageously achieved because commercially available data diodes are usually designed for high transmission rates.

With a view to performing updates remotely, it is considered advantageous if the interface device has a signature memory for storing one or more signatures considered valid, and the interface device is designed such that it checks a software update received on its external interface for the presence of one or more signatures stored as valid, in the case of successful signature verification, performs the software update and in the case of unsuccessful signature verification, omits the execution of the software update.

Furthermore, the invention relates to a method for operating an arrangement comprising a technical system, in particular a safety-related system, and a control device which controls the system and can change the technical state of the system by means of control commands.

With regard to such a method, according to the invention it is provided that a remote query signal is sent to an interface device upstream of the control device by means of an external remote query device, the interface device checks whether the remote query signal contains a query command stored as permissible in the interface device for querying system data, if a query command stored as permissible is contained in the remote query signal, this query command is passed through to the control device and otherwise passing through is omitted, and in the event of a permissible query command, the requested data is transmitted to the external remote query device.

With regard to the advantages of the method according to the invention, reference is made to the above embodiments in connection with the arrangement according to the invention.

It is advantageous if, before the passing through of the query command to the control device, the query command is first transmitted from an external interface module of the interface device to an internal interface module of the interface device, namely with a change of packet protocol or on the basis of a packet-free signal transmission and the query command is passed through from the internal interface module of the interface device to the control device.

The internal interface module preferably passes the query command through to the control device based on a third packet protocol which differs from the internal packet protocol and/or the external packet protocol, or based on a packet-free signal transmission which differs from the internal packet-free signal transmission.

It is also advantageous if in parallel to at least the last interface module in the cascade—seen from the remote query device—in other words, the interface module which is in contact with the control device, —in particular, therefore, with the internal interface module in the case of two interface modules, or a data diode is connected in parallel to the interface device as a whole and the data diode is polarized in such a way that data can be sent in the direction of the external remote query device, and if a query command is present, the requested data is transmitted via the data diode and thus past the interface module which is connected to the control device—in particular, past the internal interface module in the case of two interface modules—or past the interface device as a whole to the external remote query device.

To perform a software update, a software update file is preferably signed, namely based on one or more signatures stored as valid in the interface device. The signed software update file is preferably transmitted to the interface device which checks the software update file for the presence of one or more signatures stored as valid. In the event of successful signature verification, the software update contained in the software update file is executed and in the event of unsuccessful signature verification, the execution of the software update is omitted.

BRIEF DESCRIPTION OF THE SEVERAL VIEWS OF THE DRAWING

The invention is explained in more detail hereinafter with reference to exemplary embodiments; the figures show by way of example FIG. 1 An exemplary embodiment for an arrangement with a technical system and a control device which controls the system, wherein the control device is connected to an interface device for the purpose of remote query, FIG. 2 An exemplary embodiment for an arrangement in which a data diode is connected in parallel, parallel to the interface device, FIG. 3 An exemplary embodiment for an arrangement in which an interface device has a signature memory for the storage of signatures, FIG. 4 An exemplary embodiment for an arrangement in which an interface device is formed by a cascade of interface modules connected in series, FIG. 5 An exemplary embodiment for an arrangement in which an interface device has a cascade of interface modules and a data diode is connected in parallel to the cascade, FIG. 6 The arrangement according to FIG. 5, wherein a signature memory is also provided in the interface device, FIG. 7 An exemplary embodiment for an arrangement in which an interface device is formed by a cascade of interface modules connected in series and a data diode is provided which allows a data flow from the control device into one of the interface modules of the interface device, and FIG. 8 An exemplary embodiment for an arrangement which corresponds to the structure of the arrangement according to FIG. 7, wherein a signature memory is also provided in the interface device.

DESCRIPTION OF THE INVENTION

Figure 1:
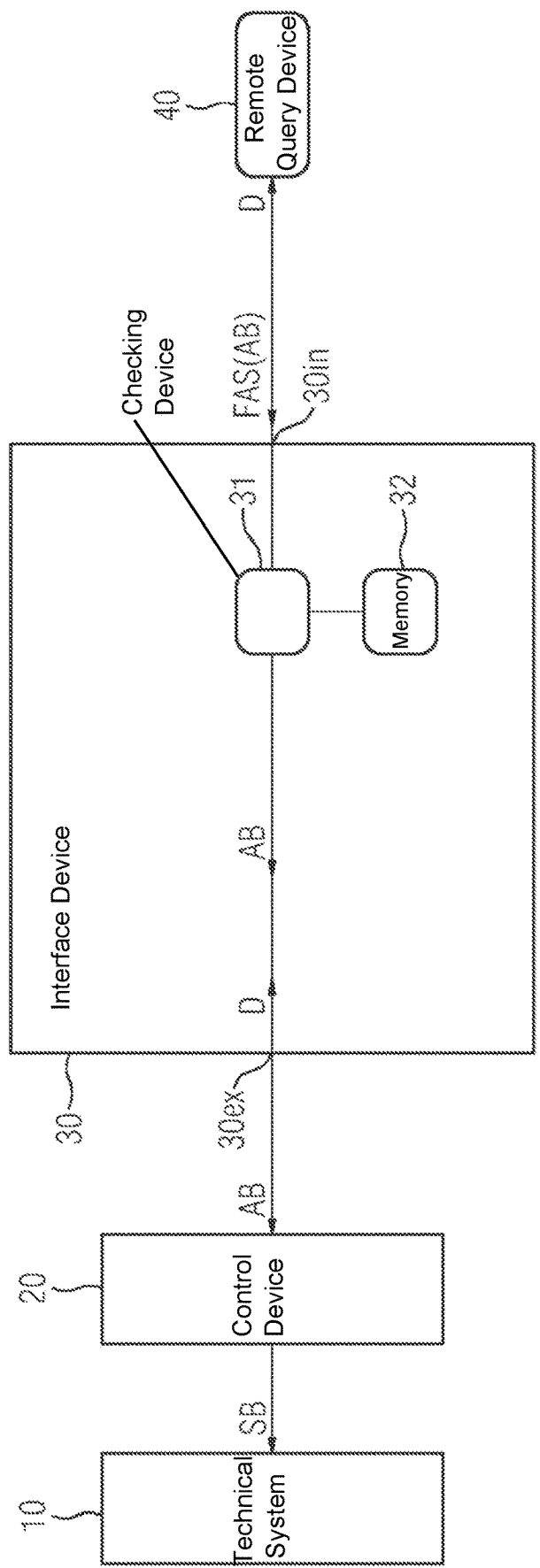

For the sake of clarity, the same reference characters are always used for identical or comparable components in the figures.

FIG. 1 shows an arrangement with a technical system 10 which can be, for example, a railway system. The technical system 10 is connected to a control device 20 which can control the technical system 10 by means of control commands SB and alter the state of the technical system by means of the control commands SB. The control device 20 can be, for example, an interlocking computer of a railway control unit or a control center computer of a railway control center.

An interface device 30 which forms an external interface for connection to an external remote query device 40 is connected to the control device 20. The interface device 30 enables remote query commands to be sent via the interface device 30 to the control device 20 by means of the remote query device 40 to initiate a transmission of requested data D.

The interface device 30 has a checking device 31 which is suitable for evaluating incoming remote query signals FAS(AB), detecting query commands AB contained therein and allowing these to pass through, insofar as they are permissible and/or are detected as permissible, to the control device 20 so that the requested data D can be transmitted from the control device 20 via the interface device 30 to the remote query device 40 by means of the query command AB. The checking device 31 has a memory 32 for checking the query command AB in which all the query commands considered permissible are stored.

The arrangement according to FIG. 1 can, for example, be operated as follows.

A remote query signal FAS(AB) is fed into an external interface 30ex of the interface device 30 by means of the remote query device 40 to query data D from the control device 20. The remote query signal FAS(AB) reaches the checking device 31 which searches the remote query signal FAS(AB) for a query command AB contained therein. If such a query command AB is identified, it is checked whether the respective query command AB is considered permissible. For this purpose, the checking device 31 accesses the memory 32 in which all the query commands considered permissible are stored. In other words, the checking device 31 compares the query command AB contained in the remote query signal FAS(AB) with the query commands contained in the memory 32 and passes through the respective query command AB via the internal interface 30 into the interface device 30 to the control device 20 if the query command was found in the memory 32 and is permissible accordingly. If no corresponding entry is found in the memory 32, the checking device 31 infers that the query command AB is invalid and cannot be passed through.

If the query command AB from the interface device 30 is received by the control device 20, the control device 20 will transmit the requested data D to the remote query device 40 via the interface device 30.

The interface device 30 according to FIG. 1 thus enables a remote query of data D of the technical system 10 by means of the remote query device 40, insofar as permissible query commands are transmitted within the context of the remote query, but it blocks any immediate feeding of control commands or query commands AB into the control device 20. The control device 20 is thus protected by the interface device 30 from immediate and/or direct access on the part of the remote query device 40.

Figure 2:
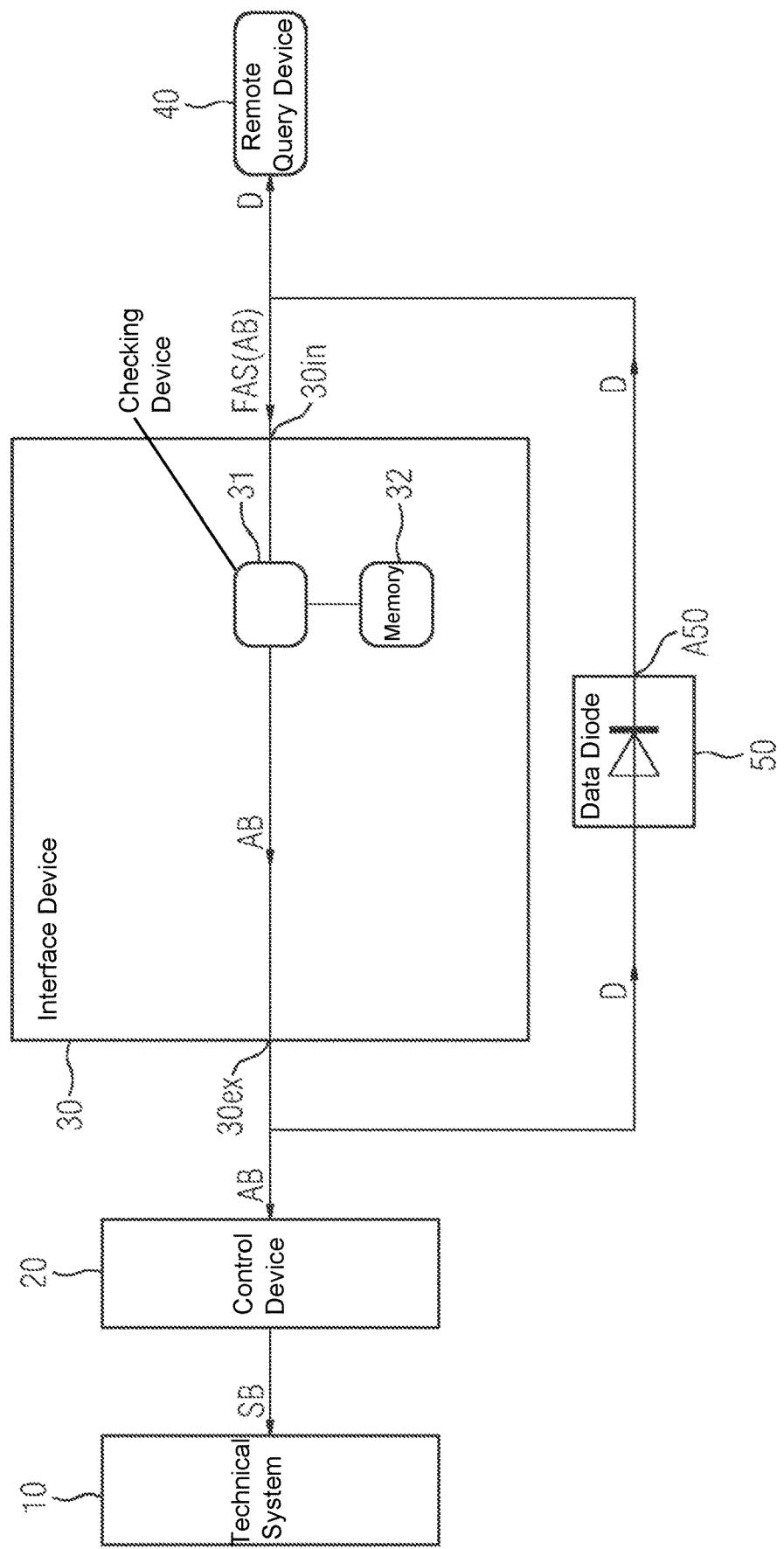

FIG. 2 shows an exemplary embodiment for a system in which a data diode 50 is connected in parallel to the interface device 30. The data diode 50 enables a unidirectional data transmission from the control device 20 in the direction of the remote query device 40, but it blocks any transfer of signals or data in the reverse direction, in this case from the remote query device 40 in the direction of the control device 20. The control device 20 is thus protected by the data diode 50 from immediate access of the remote query device 40.

If a permissible query command AB is now transmitted by means of the remote query device 40 to the interface device 30 by means of a remote query signal FAS(AB), the interface device 30 will pass the query command AB through to the control device 20. The control device 20 will transmit the requested data D via the data diode 50 to the remote query device 40.

An advantage of the arrangement according to FIG. 2 is that in a corresponding embodiment of the data diode a higher data transmission rate can be achieved than in the arrangement according to FIG. 1, in which the data D is forwarded via the bidirectionally operated interface device 30.

Otherwise, the statements in connection with FIG. 1 correspond to the exemplary embodiment according to FIG. 2.

Figure 3:
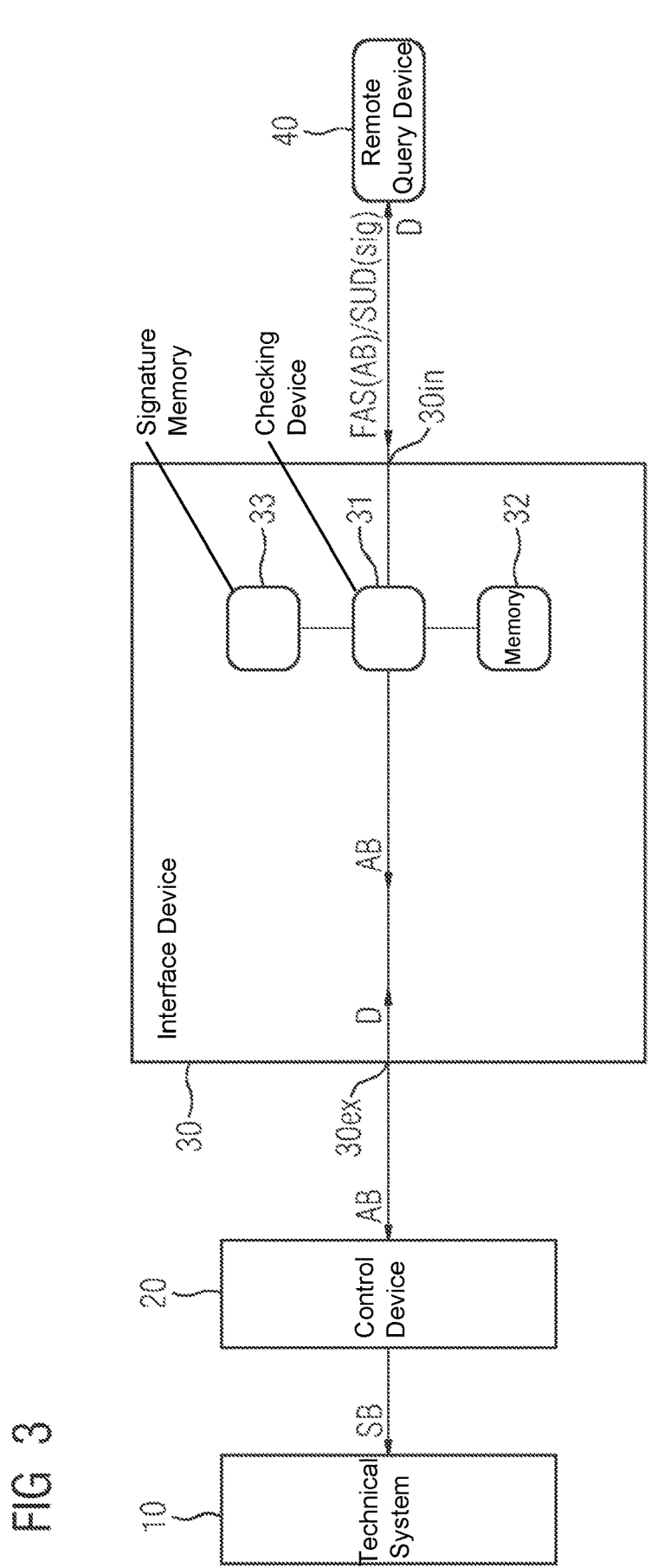

FIG. 3 shows an exemplary embodiment for an arrangement in which the interface device 30 is also equipped with a signature memory 33. Signatures which are considered valid are stored in the signature memory 33.

With the aid of the signatures stored in the signature memory 33, the checking device 31 can establish whether a signed software update file arriving at the external interface 30ex of the interface device 30 is correctly signed and the software update may be executed in the signed software update file.

The arrangement according to FIG. 3 can, for example, be operated as follows:

If the interface device 30 and/or the control device 20 are updated, a software update file containing the corresponding software update for the interface device 30 and/or the control device 20 is generated. Subsequently, the software update file is signed, wherein a signed software update file is generated. The signed software update file is characterized with the reference character SUD(sig) in FIG. 3.

The checking device 31 will now check the signed software update file SUD(sig) arriving at its external interface 30ex for a correct signature, wherein it takes into consideration the signatures which are stored in the signature memory 33. If it establishes that the software update file SUD(sig) is signed with a signature stored in the signature memory 33 and/or is correctly signed, it will permit the execution of the software update and—if the software update relates to the interface device 30—execute the software update itself or—if the software update relates to the control device 20—forward the software update to the control device 20 for execution.

The signing and signature verification can, for example, be based on key pairs having a public and a private key, as is known, for example, from PGP or S/MIME encryption.

Otherwise, the statements in connection with FIGS. 1 and 2 apply correspondingly to the arrangement according to FIG. 3. The transmission of the data D in the direction of the remote query device 40 can take place by way of the interface device 30—as shown in FIGS. 1 and 3—or by way of a data diode 50—as shown in FIG. 2.

Figure 4:
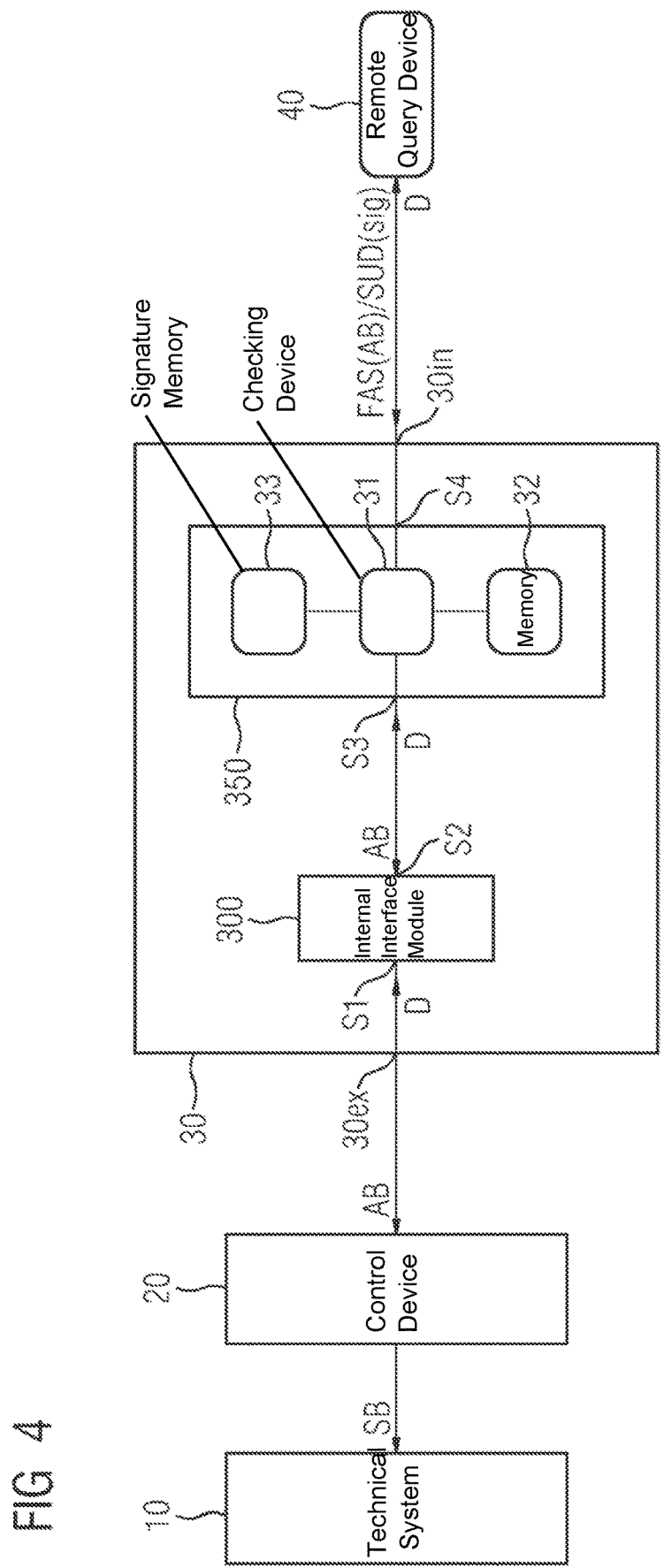

FIG. 4 shows an exemplary embodiment for an interface device 30 which comprises a cascade of two interface modules connected in series. Thus, an internal interface module 300 and an external interface module 350 can be seen in FIG. 4, each having an internal interface and an external interface.

The internal interface module 300 is connected by means of its internal interface—hereinafter referred to as first interface S1—to the internal interface 30 in the interface device 30 and thus to the control device 20. With its external interface—hereinafter referred to as second interface S2—the internal interface module 300 is connected to the upstream external interface module 350.

The external interface module 350 is connected by means of its internal interface—hereinafter referred to as third interface S3—to the second interface S2; by means of its external interface—hereinafter referred to as fourth interface S4—the external interface module 350 is connected to the external interface 30ex of the interface device 30 and thus to the remote query device 40.

The checking device 31 of the interface device 30 is preferably arranged in the external interface module 350 as the external interface module 350—seen from the remote query device 40—forms the first interface module.

The arrangement according to FIG. 4 can, for example, be operated as follows:

If a remote query signal FAS(AB) of the remote query device 40 is received on the external interface 30ex of the interface device 30 and/or on the fourth interface S4 of the external interface module 350, the checking device 31 arranged in the external interface module 350 will check whether a permissible query command AB is contained in the remote query signal FAS(AB). For this purpose, it will query the memory 32 in which query commands stored as permissible are stored, and perform a corresponding comparison. The memory 32 which contains the permissible query commands is preferably part of the external interface module 350.

If the external interface module 350 establishes that the query command AB is valid, this is transmitted by way of the third interface S3 to the second interface S2.

With a view to an optimum decoupling of the internal interface module 300 from the remote query device 40—in other words, with a view to the best possible protection from a hacker attack—it is seen as advantageous if the data transmission between the second interface S2 and the third S3 takes place in a packet-free manner or based on another packet-oriented signal transmission as the data transmission between the remote query device 40 and the fourth interface S4. In other words, if there is a breach and/or a protocol breach in the signal transmission by means of which the internal interface module 300 is decoupled from the remote query device 40 in the best possible manner.

If the query command AB is received in the internal interface module 300, it will pass this through to the control device 20. The control device 20 will subsequently transmit the requested data D via the interface device 30 to the remote query device 40, as has already been explained in connection with FIG. 1.

Figure 5:
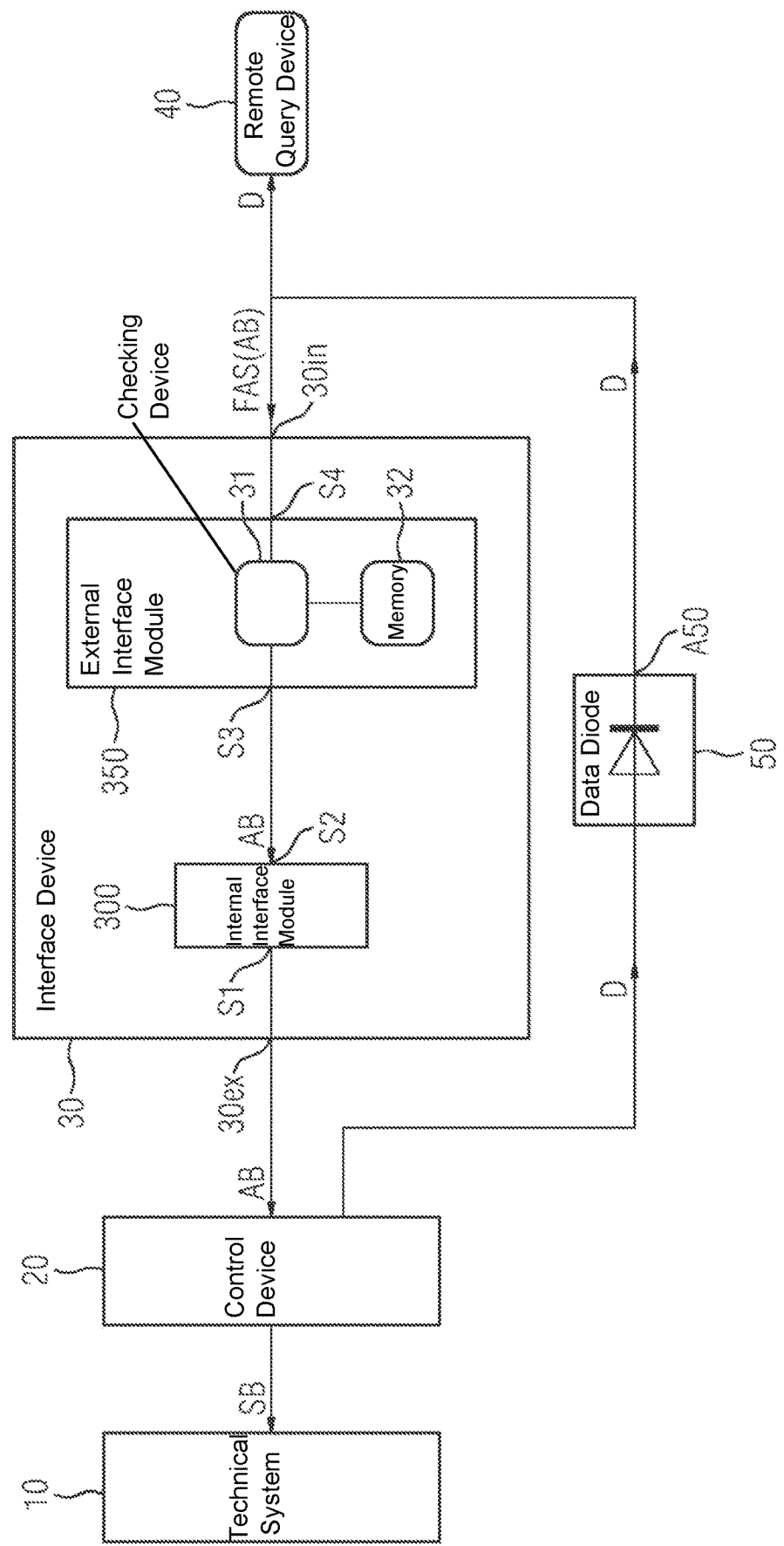

FIG. 5 shows an exemplary embodiment for an arrangement which essentially corresponds to the arrangement according to FIG. 4, with the exception that the data D is transmitted from the control device 20 to the remote query device 40 not via the interface device 30, but via a data diode 50 connected in parallel, as has already been explained in connection with the exemplary embodiment according to FIG. 2. In this regard, reference is made to the above embodiments in connection with FIG. 2.

Figure 6:
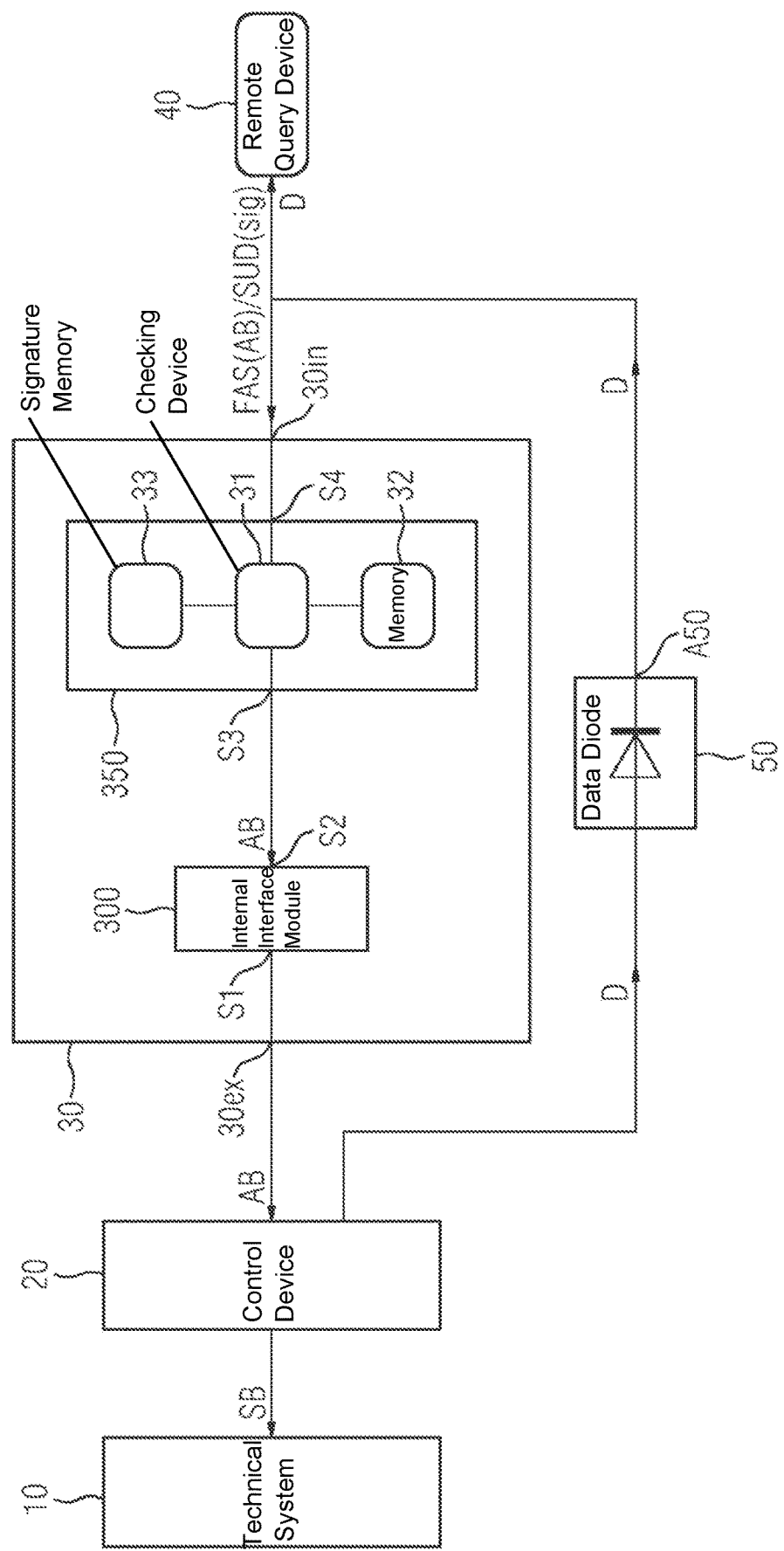

FIG. 6 shows an exemplary embodiment for an arrangement which corresponds to the arrangement according to FIG. 5, wherein in addition to the checking device 31 and the memory 32, a signature memory 33 is present in the external interface module 350. Signatures are stored in the signature memory 33 which are regarded as valid and are used to check incoming signed software update files SUD(sig), as has already been explained in connection with FIG. 3 above.

Figure 7:
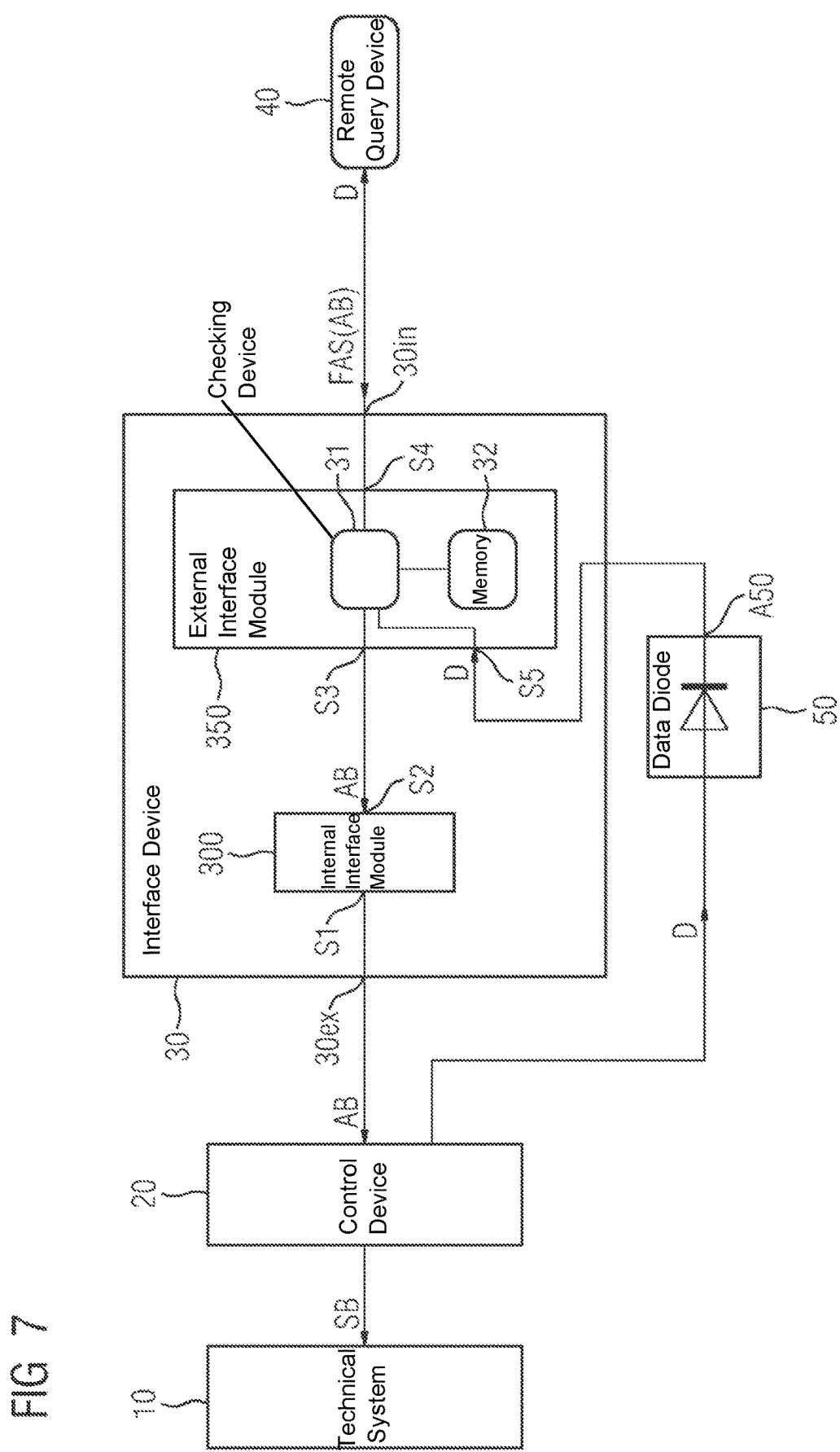

FIG. 7 shows an exemplary embodiment for an arrangement in which a data diode 50 is present, as is also provided in the exemplary embodiments according to FIGS. 5 and 6. In contrast to the exemplary embodiment according to FIGS. 5 and 6, the data diode 50 is connected differently. Thus, it can be seen that the data output A50 of the data diode 50 in the exemplary embodiment according to FIG. 7 is not directly connected to the remote query device 40, but instead to the external interface module 350, whether to the third interface S3 of the external interface module 350 or—as shown in FIG. 7—to another interface (hereinafter referred to as the fifth interface S5) of the external interface module 350. The data D requested from the control device 20 is thus not transmitted directly to the remote query device 40 by the data diode 50, but first to the external interface module 350 which then forwards the requested data to the remote query device 40.

By arranging the data diode 50 within the cascade of the interface modules 300 and 350, a particularly good decoupling between the control device 20 and the remote query device 40 is also achieved in the query direction of the data D because the data diode 50 is supported by the external interface module 350 during the separation of the control device 20 from the remote query device 40.

FIG. 8 shows an arrangement which essentially corresponds to the arrangement according to FIG. 7; in addition, in the arrangement according to FIG. 8 it is provided that the external interface module 350 is equipped with a signature memory 33 which contains signatures considered permissible for checking signed software update files SUD(sig). With regard to the checking of signed software update files SUD(sig), reference is made to the above statements in connection with FIGS. 3 and 6.

Although the invention has been illustrated and described in more detail by means of preferred exemplary embodiments, the invention is not restricted by the disclosed examples and other variations can be derived therefrom by a person skilled in the art without departing from the scope of the invention.

The invention claimed is:

1. A configuration, comprising:
   a technical system;
   a controller for controlling said technical system and can change a technical state of said technical system by use of control commands;
   an external remote query device; and
   an interface device connected to said controller and forming an external interface for connection to said external remote query device, said interface device having a checking device configured such that said checking device checks a remote query signal received for a presence of a query command stored in said interface device as permissible and in an event of permissibility only allows the query command contained in the remote query signal to pass through to said controller and blocks a passing through of the remote query signal to said controller and all other control commands which are not query commands stored as permissible, said interface device being a two-stage or multi-stage interface device and having at least two interface modules connected in series in a cascaded manner; and
   a data diode connected in parallel to at least a last interface module of said at least two interface modules in the cascaded manner, as seen from said external remote query device, that is to say, to an interface module which is connected to said controller;
   wherein in a presence of the query command, said controller transmits requested data via said data diode, and thus past said interface module connected to said controller, to said external remote query device.

2. The configuration according to claim 1, wherein said technical system is a safety-related railway system and the control commands which would change the technical state of said safety-related railway system are those which would change an operating state of said safety-related railway system.

3. The configuration according to claim 1, wherein between said at least two interface modules a signal transmission takes place with another transmission standard or on a basis of a packet protocol other than communication between said interface device and said external remote query device.

4. The configuration according to claim 3, wherein said at least two interface modules include a first interface module connected in the cascaded manner, which is connected to said external remote query device, is configured in such a way that, in a presence of the remote query signal which contains the query command recognized as permissible, said first interface module only passes through the query command to a next interface module connected in the cascaded manner, namely by means of the packet protocol change or on a basis of a packet-free signal transmission.

5. The configuration according to claim 1, wherein:
said interface device has an internal interface module and an external interface module which each have an internal interface and an external interface;
said internal interface module is connected by means of said internal interface, hereinafter referred to as a first interface, to said controller and by means of said external interface, hereinafter referred to as a second interface, to said external interface module disposed upstream of said internal interface module, said external interface module and said internal interface module are connected in a cascaded manner;
said external interface module is connected by means of said internal interface, hereinafter referred to as a third interface, to said second interface of said internal interface module;
said external interface module is connected by means of said external interface, hereinafter referred to as a fourth interface, to said external remote query device; and
said checking device is contained in said external interface module.

6. The configuration according to claim 5, wherein:
said fourth interface is a packet-oriented interface which performs protocol-based communication with said external remote query device on a basis of a predetermined external packet protocol; and
a data transmission between said second interface and said third interface is based on an internal packet-free signal transmission or is based on an internal packet protocol which differs from the predetermined external packet protocol.

7. The configuration according to claim 6, wherein said internal interface module is configured such that it passes through the query command to said first interface and thus to said controller when the query command is present at said second interface, namely on a basis of a packet-free signal transmission which differs from the internal packet-free signal transmission or on a basis of at least one feature selected from the group consisting of a third packet protocol which differs from the internal packet protocol, and a third packet protocol which differs from the predetermined external packet protocol.

8. The configuration according to claim 1, wherein said controller is configured to transmit requested data to said external remote query device via said interface device when said interface allows the query command contained in the remote query signal to pass through to said controller.

9. The configuration according to claim 1, wherein:
said interface device has a signature memory to store at least one signature considered valid; and
said interface device is configured in such a way that said interface device checks a software update received at said external interface for a presence of at least one signature stored as valid, in a case of successful signature verification, said interfaced device performs a software update and in a case of unsuccessful signature verification, omits a performance of the software update.

10. The configuration according to claim 1,
further comprising a data diode connected in parallel to said interface device as a whole; and
wherein in a presence of the query command, said controller transmits requested data via said data diode and thus past said interface device as a whole to said external remote query device.

11. The configuration according to claim 1, wherein said technical system is a safety-related system.

12. A method for operating a configuration having a technical system and a controller controlling the technical system and can change a technical state of the technical system by means of control commands, which comprises the steps of:
sending a remote query signal) to an interface device upstream of the controller by means of an external remote query device;
checking, via the interface device, whether the remote query signal) contains a query command for querying system data stored as permissible in the interface device;
passing through the query command contained in the remote query signal to the controller if the query command stored as permissible is contained in the external remote query signal, otherwise passing through of the query commend is omitted; and
transmitting requested data to the external remote query device in a case of a permissible query command;
wherein a data diode is connected in parallel to at least a last interface module of the interface device disposed in a cascaded configuration of interface modules of the interface device, seen from said external remote query device, that is to say, an interface module which is connected to the controller;
wherein the data diode is polarized in such a way that the requested data can be sent in a direction of the external remote query device; and
wherein in a presence of the query command, the requested data is transmitted via the data diode, and thus past the last interface module connected to the controller, to the external remote query device.

13. The method according to claim 12, which further comprises:
before passing through the query command to the controller, first transmitting the query command from an external interface module of the interface device to an internal interface module of the interface device, namely by means of a packet protocol change or on a basis of a packet-free signal transmission; and
passing through the query command from the internal interface module of the interface device to the controller.

14. The method according to claim 13, wherein the internal interface module passes through the query command to the controller on a basis of a packet-free signal transmission which differs from the internal packet-free signal transmission or on a basis of at least one feature selected from the group consisting of a third packet protocol which differs from an internal packet protocol, and a third packet protocol which differs from an external packet protocol.

15. The method according to claim 12, wherein:
to perform a software update, a software update file is signed, namely on a basis of at least one signature stored as valid in the interface device; and
a signed software update file is transferred to the interface device, the interface device checks the signed software update file for a presence of the at least one signature stored as valid, and in a case of successful signature verification, performs the software update contained in the software update file and in the case of unsuccessful signature verification, omits a performance of the software update.

16. The method according to claim 12, wherein:
a data diode is connected in parallel to the interface device as a whole;
the data diode is polarized in such a way that the requested data can be sent in a direction of the external remote query device; and
in a presence of the query command, the requested data is transmitted via the data diode, and thus past the interface device as a whole, to the external remote query device.

* * * * *